United States Patent [19]

Wickersham et al.

[11] Patent Number: 4,976,448
[45] Date of Patent: Dec. 11, 1990

[54] MOBILE COOLER CHEST AND COOLER CHEST SUPPORT

[75] Inventors: Wayne M. Wickersham; Colleen A. Wickersham, both of Roseville; Kevin G. Diener; JoAnn S. Diener, both of St. Clair Shores; Brian Skogler, Spring Lake, all of Mich.

[73] Assignee: Right Products, Inc., St. Clair Shores, Mich.

[21] Appl. No.: 388,669

[22] Filed: Aug. 1, 1989

Related U.S. Application Data

[63] Continuation-in-part of Ser. No. 205,680, Jun. 13, 1988, abandoned.

[51] Int. Cl.⁵ ............................ B62B 1/04; B62B 1/06
[52] U.S. Cl. ............................ 280/47.2; 280/47.23; 280/47.24; 280/47.33; 280/655.1; 62/239
[58] Field of Search ............... 280/43.11, 47.17, 47.18, 280/47.24, 47.26, 47.33, 47.34, 651, 652, 655, 655.1, 47.2, 47.23, 79.7; 62/239, 457.1

[56] References Cited

U.S. PATENT DOCUMENTS

| | | | |
|---|---|---|---|
| 391,560 | 10/1888 | Sanders et al. | 280/47.33 X |
| 767,635 | 8/1904 | Daley | 280/47.33 |
| 1,009,691 | 11/1911 | Raughtigan | 280/47.26 X |
| 1,407,235 | 2/1922 | Taylor | 280/47.33 X |
| 1,566,849 | 12/1925 | Fox | 403/328 |
| 2,501,581 | 3/1950 | Rieger | 403/93 X |
| 2,723,130 | 11/1955 | Andrews | 280/47.33 X |
| 2,780,476 | 2/1957 | Upchurch | 280/47.24 |
| 2,984,499 | 5/1961 | Humphrey | 280/47.18 |
| 3,035,847 | 5/1962 | Born | 280/47.17 X |
| 3,218,090 | 11/1965 | Herman | 280/47.26 |
| 3,305,243 | 2/1967 | Manfredi, Jr. et al. | 280/651 |
| 3,314,688 | 4/1967 | Guegold | 280/47.371 |
| 3,347,575 | 10/1967 | Morris | 16/115 X |
| 3,583,734 | 6/1971 | Magi | 16/332 X |
| 3,591,194 | 7/1971 | Vega | 280/47.26 |
| 3,873,114 | 3/1975 | Brown | 280/30 |
| 3,889,967 | 6/1975 | Sauler | 280/47.35 |
| 3,934,895 | 1/1976 | Fox | 280/47.26 |
| 3,951,425 | 4/1976 | Lohr | 280/817 |
| 4,029,328 | 6/1977 | Herterich et al. | 280/47.24 |
| 4,316,615 | 2/1982 | Willette | 280/47.33 X |
| 4,433,854 | 2/1984 | Smith | 403/328 X |
| 4,451,053 | 5/1984 | Alioa et al. | 280/47.26 |
| 4,508,468 | 4/1985 | Irwin | 403/328 |
| 4,605,378 | 8/1986 | Hamilton | 16/115 X |
| 4,717,168 | 1/1988 | Moon, Sr. | 280/641 |
| 4,724,681 | 2/1988 | Bartholomew et al. | 62/239 |
| 4,790,559 | 12/1988 | Edmonds | 280/655 |

FOREIGN PATENT DOCUMENTS

| | | | |
|---|---|---|---|
| 265034 | 3/1927 | United Kingdom | 280/47.371 |
| 564923 | 10/1944 | United Kingdom | 280/655 |
| 2075436 | 11/1981 | United Kingdom | 280/47.26 |

Primary Examiner—Charles A. Marmor
Assistant Examiner—Brian L. Johnson
Attorney, Agent, or Firm—Basile and Hanlon

[57] ABSTRACT

A mobile cooler chest is constructed with a pair of ground-engaging wheels supporting one end of the chest. A U-shaped towing handle is pivotally mounted upon the opposite end of the chest for movement between a projecting towing position and a downwardly projecting standing position in which the handle supports the chest, in cooperation with the wheels, in a stationary, level position. The handle is provided with a releasable latch operable to lock the handle in either of its towing or standing positions present. A second embodiment of the mobile cooler chest comprises a lid on the cooler chest with a first chest having a lid and a bottom wall. A mating projection and groove is formed on the first chest bottom wall and cooler chest lid, for nestingly mounting the first chest to the cooler chest. A second chest has a bottom wall, with a mating perimeter bead and complementarily shaped projection formed on the second chest bottom wall and first chest lid, for nestingly mounting the second chest to the first chest. A third embodiment of the present invention comprises a cooler chest support having a support member with a first end and second end. An axle is mounted on the first end with a wheel rotatably mounted on the axle. A pull handle is connected to the second end, for pulling the cooler chest support. L-shaped brackets are mounted on the first end of the support member for adjustably clamping a cooler to the support member.

1 Claim, 2 Drawing Sheets

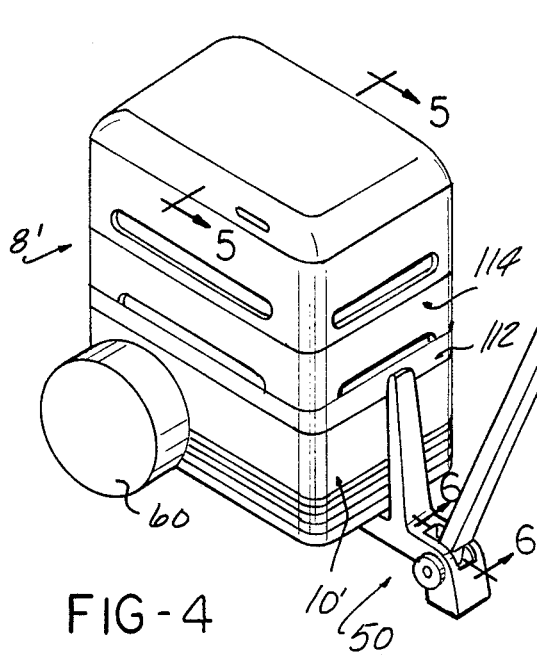
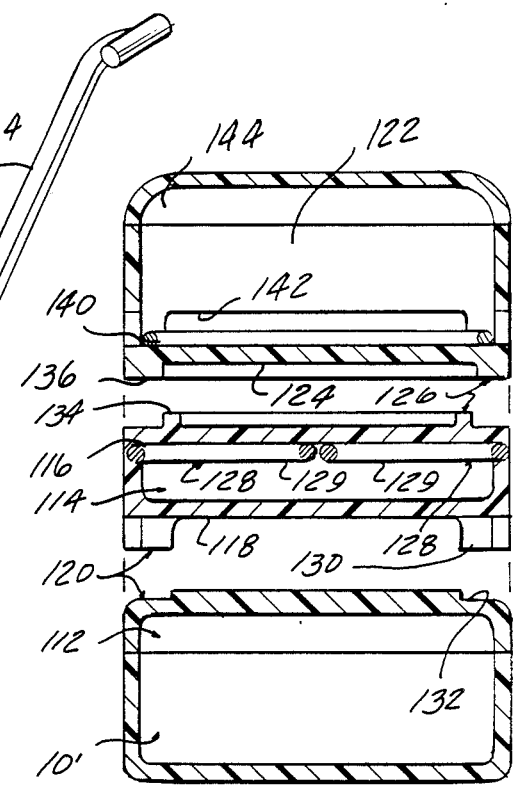
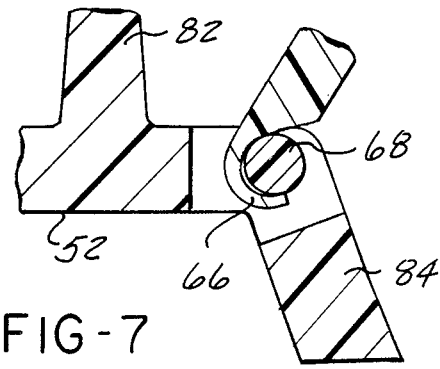
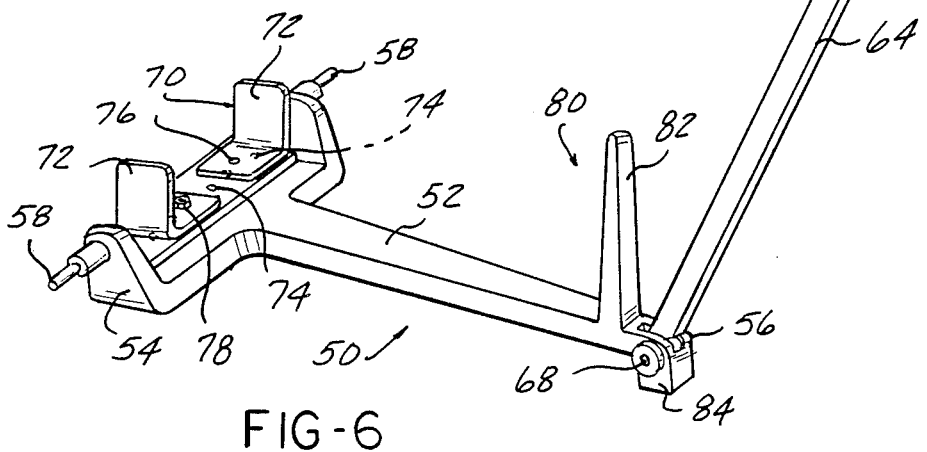

MOBILE COOLER CHEST AND COOLER CHEST SUPPORT

FIELD OF THE INVENTION

This application is a continuation-in-part of U.S. Ser. No. 07/205,680 filed on June 13, 1988 now abandoned.

BACKGROUND OF THE INVENTION

The present invention relates to a mobile cooler chest useful for transporting food, beverages, etc. as at picnics, for example. It also relates to a cooler chest support which is adjustable to fit various sized coolers.

Description of the Prior Art

Chests of this general type are known in the prior art; see, for example, Vega U.S. Pat. No. 3,591,194 and Guegold U.S. Pat. No. 3,314,688. Both of these patents disclose cooler chests provided with wheels and with a towing handle pivotally mounted at one end upon the chest for, as far as can be determined in either case, free pivotal movement relative to the chest.

In the chest of the Vega patent, which employs only a single pair of wheels, the freely pivotal handle provides no control whatsoever in stabilizing the chest against forward and rearward tilting movement about the wheel axis which will occur when the chest is being towed across uneven ground. The chest of the Guegold patent is supported by four wheels, which will subject the chest to tilting movement when towed over uneven ground. Neither of these prior art chests enable the person towing the chest of attempt to compensate for or minimize fore and aft tilting of the chest during towing by manipulation of the handle. Because such chests typically carry numerous, loose, individual items on a bed of ice, this uncontrolled tilting of the chest is particularly undesirable when loosely covered items are among the contents.

SUMMARY OF THE INVENTION

In accordance with the present invention, a generally rectangular, box-like cooler chest is mounted at one end upon a pair of ground-engaging wheels. A towing handle is pivotally connected to the opposite end of the chest by pivot connections which include latching means which are selectively operable to releasably latch the towing handle either in a projecting towing position or a standing position in which the handle projects downwardly along the end of the chest to which it is pivotally mounted to provide a ground-engaging support which, in cooperation with the wheels, will stably support the chest in a level position.

Because the handle, when latched to the chest in the towing position, is latched against pivotal movement relative to the chest, the person towing the chest can, through the handle, manually maintain the chest in a relatively level position when towing the chest across uneven ground.

Another embodiment of the present invention comprises a lid on the cooler chest. A first chest has a lid and a bottom wall. First means are formed on the first chest bottom wall and cooler chest lid, for nestingly mounting the first chest to the cooler chest. A second chest has a bottom wall, and second means are formed on the second chest bottom wall and first chest lid, for nestingly mounting the second chest to the first chest.

Another embodiment of the present invention comprises a cooler chest support having a support member with a first and second end. An axle is mounted on the first end, and a pair of wheels are rotatably mounted on the axle. Means are connected to the second end, for pulling the cooler chest support. In addition, means are mounted on the first end of the support member, for adjustably clamping a cooler to the support member.

BRIEF DESCRIPTION OF THE DRAWINGS

Other objects and features of the invention will become apparent by reference to the following specification and to the drawings, in which:

FIG. 4 is a perspective view of a second embodiment of the mobile cooler chest, shown mounted on a cooler chest support;

FIG. 5 is an exploded cross-sectional view of the mobile cooler chest taken on line 5—5 of FIG. 4;

FIG. 6 is a perspective view of a cooler chest support of the present invention; and FIG. 7 is an enlarged detail cross-sectional view taken on line 6—6 of FIG. 4, showing the J-shaped end of the pull handle connected to the rod.

DESCRIPTION OF THE PREFERRED EMBODIMENT

Figure 3:
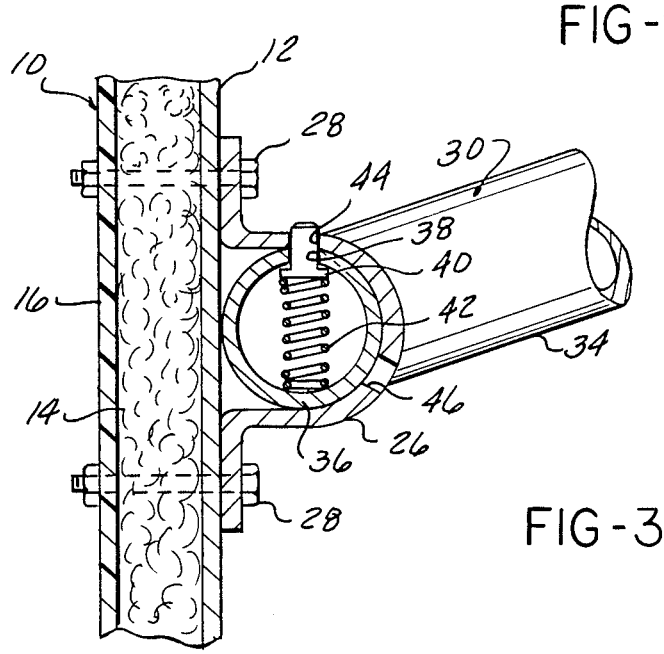
FIG. 3 is a detail cross-sectional view taken on the line 3—3 of FIG. 2, showing details of a handle latch mechanism.

The mobile chest 8 of the present invention includes a generally rectangular, box-like cooler chest designated generally 10 which, as best seen in the cross-sectional view of FIG. 3, is constructed with an outer casing of stiff plastic or sheet metal material 12 lined on its inner side with a layer of thermal insulation 14 and an inner liner 16, usually of a plastic material. Chests of this type, typically having an enclosed cooling compartment of a volume in the range of two to three cubic feet, are commercially available from several manufacturers. The basic requirement of a chest of this type insofar as the present invention is concerned is simply that the side, end walls and bottom be of substantial rigidity, a requirement which is met by those commercially available chests constructed with a stiff plastic or sheet metal outer shell.

A pair of ground-engaging wheels 18 are mounted upon the bottom of the chest near one end of the chest to provide a wheeled support for that end. While various forms of mounting means for the wheels 18 may be employed, one simple form of mount employs a pair of pillow blocks 20 fixedly secured, as by bolts, not shown, to the bottom of chest 10. The pillow blocks 20 rotatively receive an axle 24 which is fixedly secured, at its opposite ends, to wheels 18.

At the opposite end of chest 10, a pair of brackets 26 are fixedly secured to the end wall of chest 10 as by bolts 28 (see FIG. 3).

Figure 2:
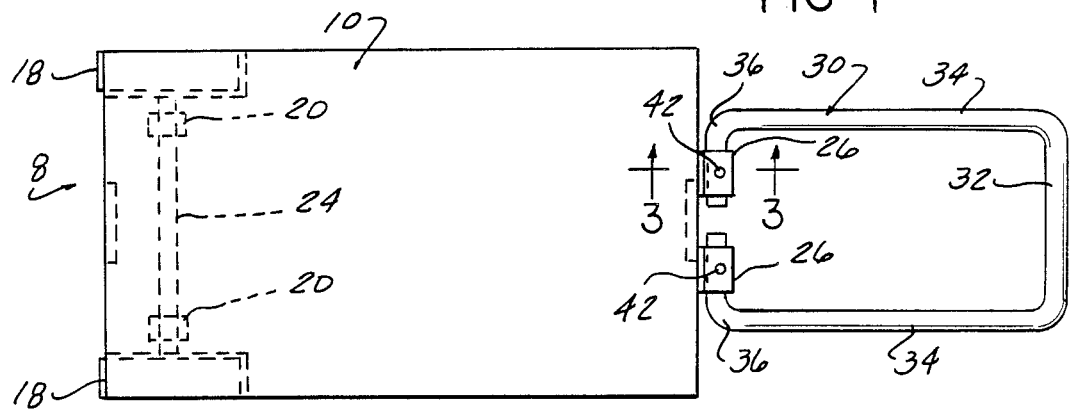
FIG. 2 is a top plan view of the chest of FIG. 1, showing the handle in the towing position.

A towing handle designated generally 30 is formed, as best seen in FIG. 2, in a generally U-shaped configuration with a reasonably wide hand-grip section 32 at the base of the U integrally joined to a pair of parallel leg portions 34. Mounting sections 36 are integral with the ends of each of legs 34 opposite hand-grip section 32 and project inward from legs 34 at right angles to be rotatively received in the respective mounting brackets 26 as best seen in FIG. 3. Brackets 26 are so configured and dimensioned as to accommodate pivotal movement of mounting sections 36 of handle 30 relative to the chest.

Figure 1:
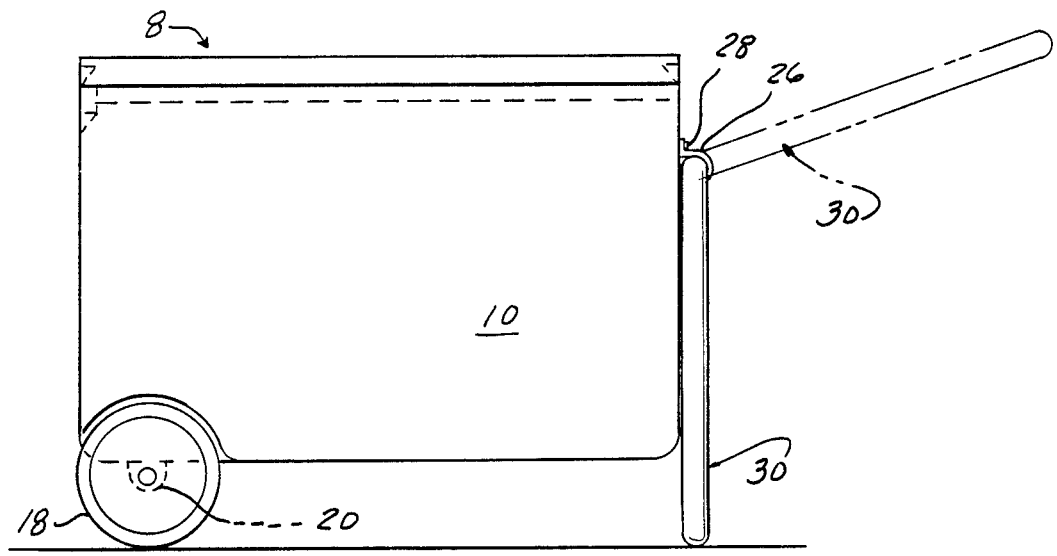
FIG. 1 is a side elevational view of a chest embodying the present invention, showing the handle in its standing position.

As best seen in FIG. 3, each of mounting sections 36 is formed with a radial bore 38 which forms a part of a releasable latch operable to selectively latch handle 30 in either the standing position illustrated in full line in FIG. 1 or a towing position indicated in broken line in FIG. 1. The latch includes a headed latch pin 40 which is biassed outwardly by a spring 42 through bore 39. In FIG. 3, handle 30 is shown latched in its towing position with the headed latch pin 40 passing through bore 38 and a bore 44 in bracket 26. With latch pin 40 in the position shown in FIG. 3, handle 30 is locked against pivotal movement relative to mounting bracket 26 and chest 10.

Depressing latch pin 40 will permit handle 30 to be pivoted, as viewed in FIG. 3, in a clockwise direction within bracket 26 to the standing position illustrated in full line in FIG. 1. At this time, the bore 38 (FIG. 3) in mounting section 36 will be aligned with bore 46 in bracket 26, and spring 42 will urge pin 40 outwardly into bore 46 to latch handle 30 against movement from the standing position shown in FIG. 1.

Preferably, the handle 30, when in its towing position shown in broken line in FIG. 1, will be in a position such that chest 10 is maintained in a level position when the handle is held by the person who will tow the chest. The rigid interconnection between the handle and chest provided by the latch mechanisms at each bracket 26 enables the person towing the chest to raise or lower the forward end of the chest to compensate for uneven ground encountered by the wheels 18. The U-shaped configuration of the handle also enables the person towing the chest to exert some compensation for tilting of the chest from side to side during towing and also accommodates the mounting of the handle of the present invention on commercially available chests which typically will have carrying handles mounted midway between the sides of the chest end walls.

Another embodiment of the mobile cooler chest is designated as 8' in FIG. 4. Mobile cooler chest 8' comprises a lid 112 on cooler chest 10'. A first chest 114 has a lid 116 and a bottom wall 118 as best seen in FIG. 5. First means 120 are formed on the first chest bottom wall 118 and cooler chest lid 112, for nestingly mounting first chest 114 to cooler chest 10'. First means 120 may comprise a mating projection 130 and groove 132, or any other suitable means. The projection 130 may be formed on first chest 114, with groove 132 being formed on cooler chest 10', as shown in FIG. 5, or the projection and groove may be in the reverse order.

A second chest 122 has a bottom wall 124. Second means 126 are formed on the second chest bottom wall 124 and first chest lid 116 for nestingly mounting second chest 122 to first chest 114. The second means 126 may comprise a mating perimeter bead 134 and complementarily shaped projection 136, or any other suitable nesting means. Bead 134 may be on first chest lid 116, as shown, with projection 136 being on second chest bottom wall 124. As with first means 120, the order may be reversed with perimeter bead 134 being on second chest bottom wall 124 and projection 136 being on first chest lid 116. In addition, mating perimeter bead 134 and complementarily shaped projection 136 may be used as first means 120, and any suitable first means 120 may also be used as second means 126.

Mobile cooler chest 8' further comprises means 122 mounted to first chest lid 116 and extendable therefrom, for supporting first chest lid 116 above a surface (not shown). This allows first chest lid 116 to be used as a free standing table. Legs 129, shown in FIG. 5, pull out in a conventional folding table manner. In addition, when perimeter bead 134 is on first chest lide 116, this helps to keep objects (not shown) on the table from rolling off on the ground.

The mobile cooler chest 8' in FIG. 4 is shown mounted on the cooler chest support of the third embodiment of the present invention. It is to be understood that the mobile cooler chest 8' of the second embodiment may be mounted in this manner, or it may be mounted on wheels 18 and have a handle 30 of the first embodiment. In addition, wheels may be mounted on cooler chest 10' for added support and mobility.

The chests of mobile cooler chest 8' may have various uses. For example, cooler chest 10' may be a conventional cooler. First chest 114 may store other non-perishable goods, such as paper products, breads, etc. Second chest 122 may be a gas barbecue having a grate 140, a vent 142 and a lid 144. Second chest 122 would have to be made out of some type of metal, with second chest bottom wall 124 being made of a thermally insulated material. The other two chests may be made from other suitable material, insulated or not, depending upon the intended use of a particular chests.

A third embodiment of the present invention comprises a cooler chest support 50 as best seen in FIG. 6. Cooler chest support 50 comprises a support member 52 having a first end 54 on upwardly bent portions (FIG. 6) and a second end 56. An axle 58 is mounted on first end 54 and a wheel 60 is rotatably mounted on axle 58, as shown in FIG. 4. Means 62 are connected to second end 56 for pulling cooler chest support 50. Pulling means 62 may comprise a pull handle 64 having a J-shaped end 66, as seen in FIG. 7. J-shaped end 66 hooks around rod 68 for secure attachment when handle 64 is up in the towing position. When handle 64 is pivoted around rod 68 in a downward position, J-shaped end 66 easily pulls off rod 68, thereby making handle 64 removably attachable to second end 56 of support members 52.

Means 70 are mounted on first end 54 of the support member 52 for adjustably clamping a cooler such as 10' to support member 52. Adjustable clamping means 70 may comprise two L-shaped brackets 72 with a plurality of spaced apertures 74 formed in one of the support member 52 and the bracket 72. An aperture 76 formed in the other of support member 52 and brackets 72, is alignable with any one of the plurality of apertures 74. It is to be understood that either the brackets or the support member can have the plurality of apertures 74, with either the brackets 72 or the support member 52 having the single aperture 76. Clamping means 70 may further comprise means 78, receivable through the aligned apertures, namely aperture 76 and one of apertures 74, for fastening brackets 72 to support member 52 in a predetermined lateral spacing. This fastening means may comprise a nut and through bolt, a threaded screw, or any other suitable fastening means. Adjustable clamping means 70 may also comprise any suitable means, such as a slot (not shown) formed in support member 52 or brackets 72 and an aperture formed in the other of the brackets 72 or support member 52, with a bolt and a wing nut adjustably securing bracket 72 to support member 52. In addition, brackets 72 may be permanently adhesived to fit a particular size cooler chest 10'.

Cooler chest support 50 may further comprise means 80, disposed on support member 52, for preventing forward longitudinal movement of cooler 10' with respect to support member 52. This preventing means 80 may comprise a stop 82, joined to and extending upward from support member 52, with the stop 82 being intermediate first end 54 and second end 56 of support member 52. Also, any other suitable preventing means 80 may be used.

Cooler chest support 50 may further comprise a stand off 84, joined to and extending downward from second end 56, for supporting cooler chest support 50 in a level position.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A cooler chest support, comprising:
   a T-shaped support member having a first end and a second end, the first end being formed as an elongated leg, the leg having an upper surface;
   two axles, each axle mounted on an opposite end of the leg at an upwardly bent position thereof;
   a wheel rotatably mounted on each axle;
   a T-shaped pull handle for pulling the cooler chest support, the handle having a J-shaped distal end removably attachable to the second end of the support member;
   two L-shaped brackets, for adjustably clamping a cooler chest to the support member leg, the brackets adjustably attached to the upper surface of the leg of the support member, the brackets adapted to move longitudinally relative to the leg;
   a plurality of spaced apertures formed in one of the leg and the brackets;
   an aperture formed in the other of the leg and the brackets, the aperture being alignable with any one of the plurality of apertures;
   means, receivable through the aligned apertures, for fastening the brackets to the support member in a predetermined lateral spacing;
   a stop, joined to and extending upward from the support member, for preventing forward longitudinal movement of the cooler chest with respect to the support member, the stop being intermediate the first and second ends of the support member; and
   a stand off, joined to and extending downward from the second end of the support member, for supporting the cooler chest support in a level position.

* * * * *